March 29, 1932.  F. H. SMITH  1,851,138
HYDRAULIC PRESS
Filed May 5, 1928  2 Sheets-Sheet 1
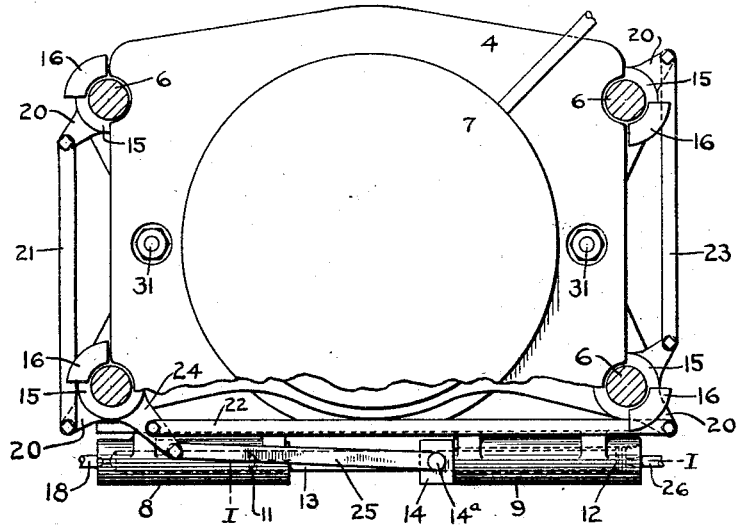
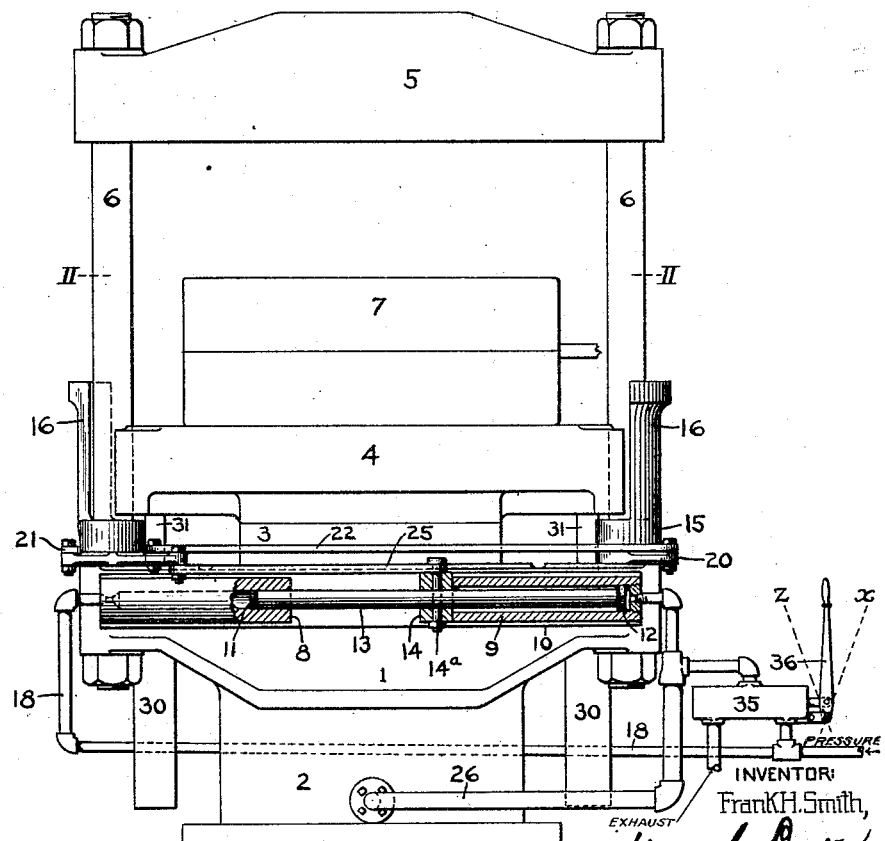
INVENTOR:
Frank H. Smith,
by Murray C. Boyer
Atty.

March 29, 1932.　　　F. H. SMITH　　　1,851,138

HYDRAULIC PRESS

Filed May 5, 1928　　　2 Sheets-Sheet 2

INVENTOR:
Frank H. Smith,
by Murray C. Boyer
Atty.

Patented Mar. 29, 1932

1,851,138

UNITED STATES PATENT OFFICE

FRANK H. SMITH, OF CLEVELAND, OHIO, ASSIGNOR TO SOUTHWARK FOUNDRY & MACHINE COMPANY, OF EDDYSTONE, PENNSYLVANIA, A CORPORATION OF PENNSYLVANIA

HYDRAULIC PRESS

Application filed May 5, 1928. Serial No. 275,537.

My invention relates to hydraulic presses employed in the holding of molds during the curing of tires, tire carcasses and the like, and the object of my invention is to provide means for supporting the lower platen in its raised position and while the pressure is on during a curing operation.

My invention comprises members rotatable with respect to the supporting posts of the press, which members are automatically moved into supporting position after the pressure which raises the lower platen has built up, and automatically moved out of supporting position when the pressure employed to lift the lower platen is exhausted.

These and other features of my invention are more particularly described hereinafter; reference being had to the accompanying drawings, in which:

Figure 1 is a front elevation of an hydraulic press to which the auxiliary supporting mechanism forming the subject of my invention may be applied; the same being shown in the inactive poistion, and such view being partly in section on the line I—I Fig. 2.

Fig. 2 is a plan view partly in section on the line II—II Fig. 1.

Figure 4:
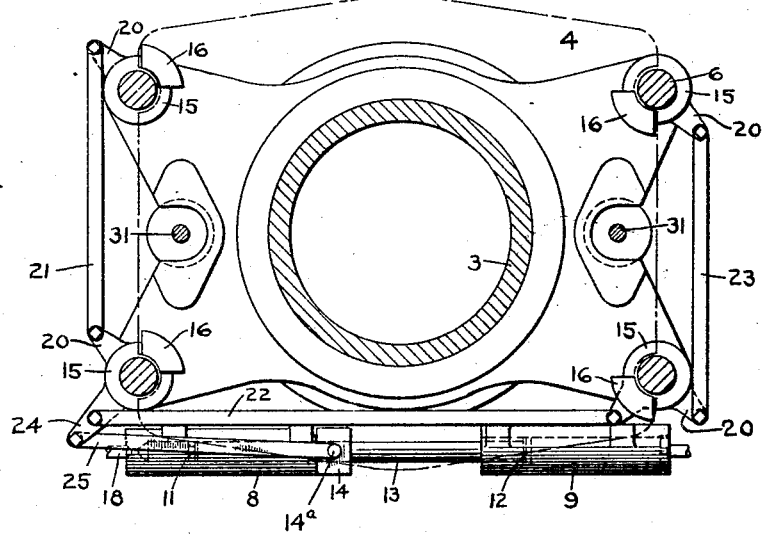
Fig. 4 is a plan view partly in section of the line IV—IV Fig. 3.

In the drawings, 1 represents the frame or base portion of an hydraulic press, having the usual cylinder 2, within which is disposed the usual ram 3, and 4 represents the platen connected to such ram. An upper platen or cross-head is indicated at 5, and in the present instance may be a fixed structure; being carried by posts 6 connected to and projecting upwardly from the base of the press. Molds containing tires or tire carcasses to be cured. one of which is indicated at 7, are placed upon the platen 4 and pressure having been directed to the cylinder 2, the ram will rise and carry up the platen until the mold is in engagement with the upper platen or cross-head 5, whereupon the pressure will build up and hold the mold in such position during the curing operation.

In the curing of these tires or tire carcasses, they are usually mounted in a mold in the form of a sectional hollow shell receiving hot water, steam, and/or the like, and in addition a tubular member is introduced into the interior of the carcass and filled with hot water under pressure. If, for any cause, the pressure holding the lower platen in position should become impaired or leak away during the curing operation, such lower platen would tend to lower and if this happened, the mold sections would separate; the inner tubular structure would explode, and the hot water contained therein would be discharged to the great injury and discomfort of the operators.

For the purpose of avoiding this contingency I provide auxiliary supporting means for the lower platen, automatically moved into and out of operative position; such mechanism including a pair of cylinders 8 and 9, which may be mounted upon a plate 10, disposed at the front of the press, or at some other convenient place; such cylinders containing pistons 11 and 12 of different cross sectional area, connected together by a piston rod 13. This piston rod carries a cross-head 14, which may be connected thereto by a bolt 14$^a$, and this cross-head is operatively connected by a series of links and levers to rotatable members mounted on the posts 6.

The rotatable members may comprise rings or collars 15, with upwardly projecting sustaining lugs 16. The normal position of these lugs is illustrated in Figs. 1 and 2.

The cylinder 8 is open to pressure at all times from the main line 18 which, in the present arrangement of the cylinders 8 and 9, tends to move and hold the pistons 11 and 12 toward the right, as indicated in Figs. 1 and 2 of the drawings, holding the cross-head 14 carried by the piston rod 13 toward the right, and maintaining the auxiliary supporting means in the inactive position. The several ring or collar members 15 are provided with arms 20, which are pivotally connected to links 21, 22 and 23, while an additional arm 24 carried by one of the collars, that at the front left-hand side of the press in the present arrangement, is connected to a link 25 whose opposite end is pivotally connected to the bolt 14ᵃ of the cross-head 14.

Figure 3:
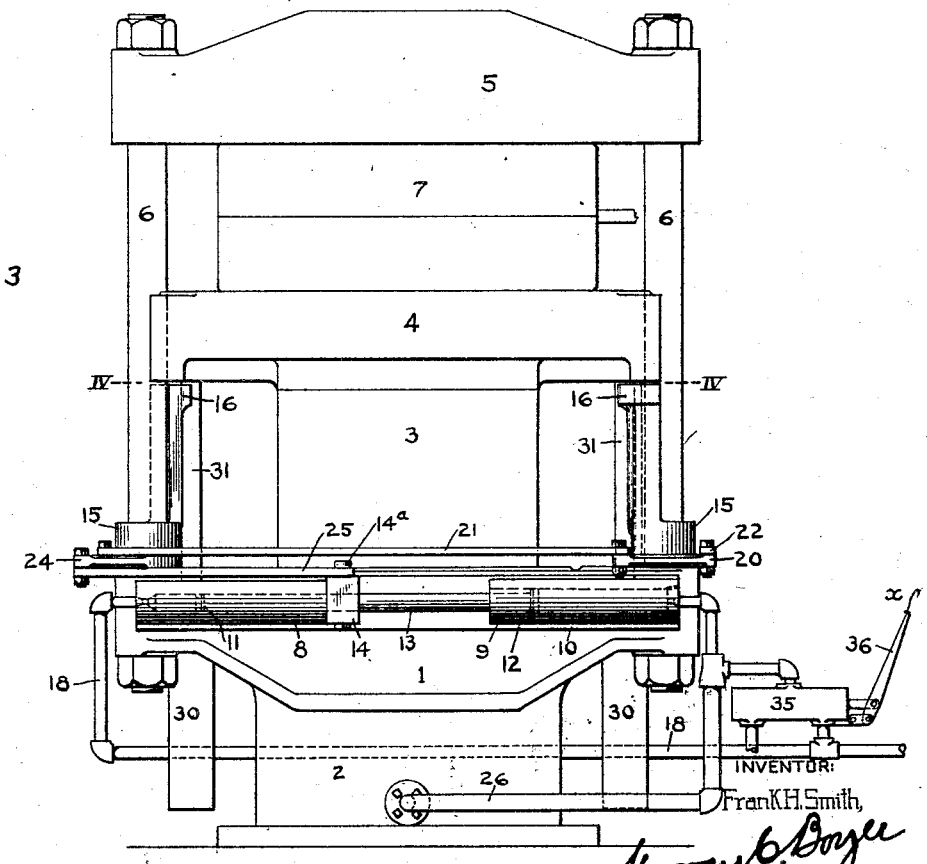
Fig. 3 is a view similar to Fig. 1, showing the auxiliary supporting mechanism in the active position.

The cylinder 9, is connected to the line 26 admitting pressure to the cylinder 2, and when the pressure builds up in this cylinder, after the ram has elevated the lower platen to the position shown in Fig. 3, such pressure acting upon the piston 12, which is larger than the piston 11, will be in excess of the line pressure acting upon said piston 11, and will move said piston 12 to the left, carrying with it the piston rod 13, cross-head 14 and piston 11, and through the links 21, 22 and 23, the several collars 15 will be turned on the posts 6 so as to bring their supporting lugs 16 into a position underneath the edges of the platen 4, in its elevated position, as clearly shown in Figs. 3 and 4.

Should the pressure tending to maintain the platen in the raised position drop for any reason, as by an accident in the line or from any other cause, there will be no pressure acting upon either piston 11 or 12, hence the auxiliary supporting lugs 16 will remain in the position indicated in Figs. 3 and 4; supporting the platen 4 in the raised position.

When the cylinder 2 is opened to exhaust, the pressure acting upon the piston 12 and tending to hold the pistons 11 and 12, to the left will be released, and the line pressure will then act upon the piston 11; moving the same to the right together with the piston rod 13 and the cross-head 14, and through the linkage indicated, connected to the cross-head 14, the collars 15 will be rotated upon the posts 6 and the supporting lugs 16 will be moved away from their position beneath the edges of the platen 4, and the latter may lower. To assist such lowering operation I may employ pull down pistons disposed in the cylinders 30, and having piston rods 31 connected to the platen 4.

The pressure for operating the press may be under the control of a valve 35, operated by a lever 36 which, when moved to position x, will place the valve in position to admit pressure to the cylinder 2, and when moved to position z, will place such valve in position to open said cylinder to exhaust. The movements of the lever to position the valve for the inlet and exhaust of motive fluid to and from the cylinder 2 may be reversed, if desired.

While I have shown a series of auxiliary supporting members arranged to be moved into and out of supporting position with respect to the movable platen, it is obvious that a single supporting member might be used under some conditions, and the broader of the appended claims are to be understood as covering such single supporting member.

I claim:

1. The combination, with an hydraulic press, having an upper cross-head and the usual movable platen, and a source of pressure for raising said platen, of an auxiliary supporting member revolubly movable into and out of supporting position beneath the platen, and fluid-pressure means for automatically actuating said supporting member into and out of operative position.

2. The combination, with an hydraulic press, having an upper cross-head and the usual platen, and a source of pressure for raising said platen, of an auxiliary supporting member movable into and out of supporting position with respect to the platen when the latter is raised, and means whereby the pressure operating the platen may actuate said supporting member into and out of operative position.

3. The combination, with an hydraulic press, having an upper cross-head and the usual platen, and a source of fluid pressure for raising said platen, of an auxiliary supporting member movable into and out of supporting position with respect to the platen when the latter is raised, and fluid-operated means for actuating said supporting member into and out of operative position; said fluid-operated means including differential pistons and cylinders therefor in communication with the fluid pressure serving to raise the platen.

4. The combination, with an hydraulic press, having an upper cross-head and the usual platen, and a source of fluid pressure for raising said platen, of auxiliary supporting members movable into and out of supporting position with respect to the platen when the latter is raised, and fluid-operated means for actuating said supporting members into and out of operative position; said fluid-operated means including differential pistons and cylinders therefor in communication with the fluid pressure serving to raise the platen.

5. The combination, with an hydraulic press, having an upper cross-head and the usual platen, and pressure means whereby said platen may be raised to confine a mold between the same and said cross-head, of a revoluble member arranged to be moved into position beneath the platen when the latter is in the raised position, and pressure-operated means operatively connected to the pressure means for raising the platen for automatically moving said revoluble member into supporting position when the pressure serving to raise the platen builds up.

6. The combination, with an hydraulic press, having an upper cross-head and the usual platen, and pressure means whereby said platen may be raised to confine a mold between the same and said cross-head, of a series of revoluble members arranged to be moved into and out of supporting position beneath the platen when the latter is in the raised position, and pressure-operated means operatively connected to the pressure means for raising the platen for automatically moving said revoluble members into and out of supporting position; the former movement taking place when the pressure serving to raise the platen builds up and the latter movement taking place when such pressure is open to exhaust.

7. The combination, with an hydraulic press, having an upper cross-head and the usual platen and pressure means whereby said platen may be raised to confine a mold between the same and said cross-head, of a revoluble member arranged to be moved into position beneath the platen when the latter is in the raised position differential pistons and cylinders therefor in communication with the pressure serving to raise the platen, and a link connection between said differential pistons and the revoluble member whereby movement of said differential pistons in one direction will actuate said revoluble member into supporting position beneath said platen.

8. The combination, with an hydraulic press, having an upper cross-head and the usual platen and pressure means whereby said platen may be raised to confine a mold between the same and said cross-head, of a revoluble member arranged to be moved into position beneath the platen when the latter is in the raised position, differential pistons and cylinders therefor in communication with the pressure serving to raise the platen, and link connections between said differential pistons and the revoluble member whereby movement of said differential pistons in opposite directions will actuate said revoluble member into and out of supporting position with respect to said platen.

9. The combination, with an hydraulic press, having the usual platen an upper cross-head, and posts carried by the press and supporting said cross-head, of a member mounted on one of said posts and revoluble into position beneath the platen when the latter is in the raised position, pressure means for lifting the platen, and pressure-operated means operatively connected to the pressure means for lifting the platen automatically set in motion when the platen reaches the limit of its upward movement to move said revoluble member into supporting position beneath said platen.

10. The combination, with an hydraulic press, having the usual platen, an upper cross-head, and posts carried by the press and supporting said cross-head, of members rotatably mounted on said posts and revoluble into position beneath the platen when the platen is raised, pressure means for lifting the platen, means for effecting simultaneous movement of the revoluble members into and out of active position, and fluid-pressure actuated means including differential pistons for automatically actuating the means for moving the revoluble members.

11. The combination, with an hydraulic press, having the usual platen, an upper cross-head, and posts carried by the press and supporting said cross-head, of members rotatably mounted on said posts and revoluble into position beneath the platen when the platen is raised, pressure means for lifting the platen, connecting links for effecting simultaneous movement of the revoluble members into and out of active position, and fluid-pressure actuated means including differential pistons for automatically actuating said connecting links; said fluid-pressure actuated means moving in opposite directions respectively when the pressure lifting the platen builds up and when it exhausts.

12. The combination, with an hydraulic press, having the usual platen, an upper cross-head, posts carried by the press and supporting said cross-head, means for lifting said platen including a cylinder, a source of main line pressure communicating therewith, and a ram mounted in said cylinder and connected to said platen, of an auxiliary supporting member rotatably mounted on one of said posts and revoluble into position beneath the platen when the same is lifted, a cylinder in communication with the ram cylinder, a second cylinder in communication with the main line, a piston rod having pistons arranged to move in each cylinder, a crosshead carried by said piston rod, and a connection between said cross-head and said revoluble member whereby the latter will be moved when said piston rod is actuated in either direction.

13. The combination, with an hydraulic press, having the usual platen, an upper cross-head, posts carried by the press and supporting said cross-head, means for lifting said platen including a cylinder, a source of main line pressure communicating therewith, and a ram mounted in said cylinder and connected to said platen, of a series of auxiliary supporting members rotatably mounted on said posts an revoluble into position beneath the platen when the same is lifted, a cylinder in communication with the ram cylinder, a second cylinder in communication with the main line, a piston rod having pistons arranged to move in each cylinder, a cross-head carried by said piston rod, arms connected to said revoluble members, links connecting said arms, and a connection between said cross-head and one of said arms whereby the links will be actuated to move the auxiliary supporting members when said piston rod is actuated in either direction.

14. The combination, with an hydraulic press, having the usual platen, an upper cross-head, posts carried by the press and supporting said cross-head, means for lifting said platen including a cylinder, a source of pressure communicating therewith, and a ram mounted in the cylinder and connected to said platen, of an auxiliary supporting member rotatably mounted on one of said rods and revoluble into position beneath the platen when the same is lifted, a horizontally disposed cylinder in communication with the ram cylinder, a second horizontally disposed cylinder of smaller diameter in communication with the main line; a piston rod having pistons arranged to move in each cylinder, an arm connected to said revoluble member, and a cross-head carried by said piston rod and operatively connected to said arm; the pressure from the ram cylinder actuating the piston in said first-mentioned horizontal cylinder when such pressure builds up after the platen has been raised to cause the piston rod to actuate said arm and move the auxiliary supporting member beneath said platen.

15. The combination, with an hydraulic press, having the usual platen, an upper cross-head, posts carried by the press and supporting said cross-head, means for lifting said platen including a cylinder, a source of pressure communicating therewith, and a ram mounted in the cylinder and connected to said platen, of a series of auxiliary supporting members rotatably mounted on said rods and revoluble into position beneath the platen when the same is lifted, a horizontally disposed cylinder in communication with the ram cylinder, a piston and piston rod therein, a second horizontally disposed cylinder of smaller diameter in communication with the main line, a piston rod having pistons arranged to move in each cylinder, arms connected to said revoluble members, links connecting said arms, and a cross-head carried by said piston rod and operatively connected to said links for simultaneous movement of said arms; the pressure from the ram cylinder actuating the piston in said first-mentioned horizontal cylinder when such pressure builds up after the platen has been raised to cause the piston rod to actuate said links and move the auxiliary supporting members beneath the platen.

In witness whereof I have signed this specification.

FRANK H. SMITH.